US008085740B2

(12) United States Patent  
Zhang et al.

(10) Patent No.: US 8,085,740 B2  
(45) Date of Patent: Dec. 27, 2011

(54) TECHNIQUES FOR OFFERING SEAMLESS ACCESSES IN ENTERPRISE HOT SPOTS FOR BOTH GUEST USERS AND LOCAL USERS

(75) Inventors: Junbiao Zhang, Bridgewater, NJ (US); Kumar Ramaswamy, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 920 days.

(21) Appl. No.: 10/553,648

(22) PCT Filed: Mar. 8, 2004

(86) PCT No.: PCT/US2004/007065  
§ 371 (c)(1),  
(2), (4) Date: Oct. 14, 2005

(87) PCT Pub. No.: WO2004/095803  
PCT Pub. Date: Nov. 4, 2004

(65) Prior Publication Data  
US 2007/0025302 A1  Feb. 1, 2007

Related U.S. Application Data

(60) Provisional application No. 60/463,060, filed on Apr. 15, 2003.

(51) Int. Cl.  
*H04W 4/00* (2009.01)
(52) U.S. Cl. .................... 370/338; 370/328
(58) Field of Classification Search .............. 370/338, 370/328, 310, 329; 455/410–411, 435.2, 455/41.2, 41.3, 426.1, 432.1, 435.1, 418–420  
See application file for complete search history.

(56) References Cited

U.S. PATENT DOCUMENTS 6,591,306 B1 * 7/2003 Redlich .......................... 709/245  
6,792,474 B1 * 9/2004 Hopprich et al. .............. 709/245  
(Continued)

FOREIGN PATENT DOCUMENTS

EP  1 191 763 A2  3/2002  
(Continued)

OTHER PUBLICATIONS

Search Report dated Aug. 13, 2004.

*Primary Examiner* — Brandon Miller  
(74) *Attorney, Agent, or Firm* — Robert D. Shedd; Robert B. Levy

(57) ABSTRACT

A wireless Local Area Network (LAN 11) capable of providing "enterprise guest" hosting includes at least one an e-open wireless LAN access point (15) that provides access to both guests and local users. Upon receipt of a request for access, the access point forwards the request to an authentication proxy. The authentication proxy then authenticates the party requesting access in accordance with that party's status (that is, whether the party is a local user or guest). Upon successful authentication, the network routes the traffic from a local user differently as compared to that for a guest. For example traffic from guests goes to gateway for receipt in an external network such as the Internet, whereas traffic from the local user goes to a local network, e.g., a corporate intranet. In this way, the Wireless LAN 11, after ascertaining the status of the party requesting access, can limit guest traffic according to the guest access policy.

11 Claims, 1 Drawing Sheet

U.S. PATENT DOCUMENTS

| | | | |
|---|---|---|---|
| 6,834,341 B1 * | 12/2004 | Bahl et al. | 713/156 |
| 6,950,628 B1 * | 9/2005 | Meier et al. | 455/41.2 |
| 7,127,524 B1 * | 10/2006 | Renda et al. | 709/245 |
| 7,142,851 B2 | 11/2006 | Zhang et al. | |
| 7,177,637 B2 * | 2/2007 | Liu et al. | 455/426.1 |
| 7,284,062 B2 * | 10/2007 | Krantz et al. | 709/229 |
| 7,389,105 B2 * | 6/2008 | Ala-Laurila et al. | 455/406 |
| 7,515,569 B2 * | 4/2009 | Prasad | 370/338 |
| 7,529,933 B2 * | 5/2009 | Palekar et al. | 713/168 |
| 2002/0041689 A1 | 4/2002 | Morimoto | |
| 2002/0059441 A1 | 5/2002 | Hasegawa | |
| 2002/0075844 A1 * | 6/2002 | Hagen | 370/351 |
| 2002/0157090 A1 * | 10/2002 | Anton, Jr. | 717/178 |
| 2003/0051132 A1 | 3/2003 | Kobayashi et al. | |
| 2004/0100973 A1 * | 5/2004 | Prasad | 370/401 |
| 2004/0111520 A1 * | 6/2004 | Krantz et al. | 709/229 |
| 2004/0203783 A1 * | 10/2004 | Wu et al. | 455/436 |
| 2006/0193297 A1 | 8/2006 | Zhang et al. | |

FOREIGN PATENT DOCUMENTS

| | | |
|---|---|---|
| EP | 1241902 A2 | 9/2002 |
| JP | 2002/118562 | 4/2002 |
| JP | 2002149475 | 5/2002 |
| JP | 2002328900 | 11/2002 |
| JP | 2003/087289 | 3/2003 |
| WO | WO2004084464 A2 | 9/2004 |

* cited by examiner

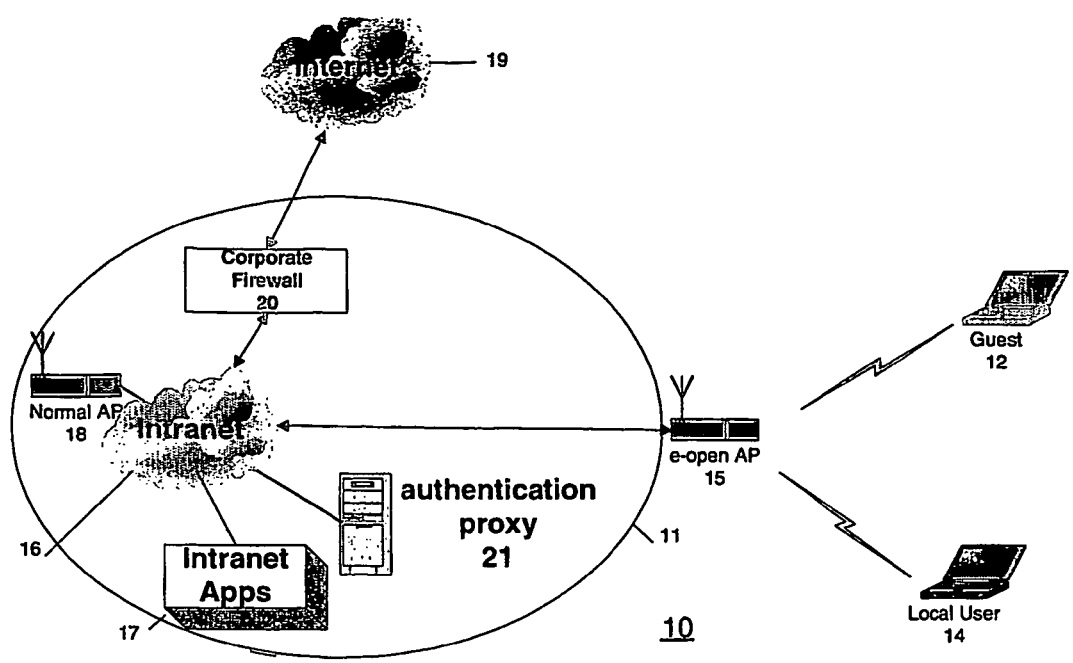

TECHNIQUES FOR OFFERING SEAMLESS ACCESSES IN ENTERPRISE HOT SPOTS FOR BOTH GUEST USERS AND LOCAL USERS

This application claims the benefit, under 35 U.S.C. §365 of International Application PCT/US04/07065, filed Mar. 8, 2004, which was published in accordance with PCT Article 21(2) on Nov. 4, 2004 in English and which claims the benefit of U.S. provisional patent application No. 60/463,060, filed Apr. 15, 2003.

TECHNICAL FIELD

This invention relates a technique for handling different types of traffic at a wireless Local Area Network (LAN)

BACKGROUND ART

Advances in the field of wireless LAN technology has led to the availability of relatively inexpensive wireless LAN equipment, thus giving rise to the so-called "Enterprise Guesting" market. Many companies and institutions now offer wireless LAN enterprise access in different locations, such as meeting rooms and lobbies, affording visitors the ability to gain network access. One key issue associated with Enterprise Guesting is how to distinguish between guests and internal (i.e., local) users in order to route traffic on different paths. Preferably, guest traffic should travel to an enterprise gateway for routing to an external destination, such as the Internet or the guest's own intranet (through VPN). (In the event traffic from a guest is destined for the local network, that traffic should enter the network through a corporate firewall, as would any other external traffic.) A local user connected via an "Enterprise" access point should receive wireless access from such an enterprise hot spot just as that user would in other places within the company having wireless LAN access point(s). Traffic from the local user should enter the local network just as if the user were connected by a wired connection.

Once existing solution to the problem of separating local user traffic from guest traffic requires that only guests enjoy wireless LAN access at an enterprise access point ("hot spot".) Local users must access the enterprise access point just like visitors do. To allow a local user to enjoy access to the local intranet, one or more additional access points must exist alongside enterprise (guest host) access point(s). Another solution makes use of MAC addresses to distinguish between guests and local users. Such a solution requires all local users to register their wireless cards and requires maintenance of a hardware database.

Thus, there is need for a technique for separating traffic from guests and local users at an enterprise hot spot that overcomes the aforementioned disadvantages.

BRIEF SUMMARY OF THE INVENTION

Briefly, in accordance with a preferred embodiment of the present principles, there is provided a method for offering wireless LAN access to both local users (i.e., parties that are known to the wireless LAN) as well as guests, (i.e., parties typically unknown to the wireless LAN). The method commences upon receipt of a request for access at an access point in the wireless LAN capable of accommodating both local users and guests. The party requesting access undergoes authentication in accordance with that party's status (that is, whether the party is a local user or guest). In other words, to the extent that no determination has been made prior to authentication as to the status of the party seeking access, the authentication server will determine the status of the party. Upon successful authentication, different routing occurs for the traffic from a local user as compared to that for a guest. For example traffic from guests goes to gateway for receipt in an external network such as the Internet, whereas traffic from the local user goes to a local network, e.g., a corporate intranet. In this way, the Wireless LAN, after ascertaining the status of the party requesting access, can limit guest traffic according to the guest access policy.

BRIEF DESCRIPTION OF THE DRAWING

FIG. 1 depicts a block schematic diagram of an enterprise guest host architecture in accordance with a preferred embodiment of the present principles.

DETAILED DESCRIPTION

FIG. 1 depicts an enterprise guest host architecture 10 that includes a wireless Local Area Network (LAN) 11 for offering seamless wireless access to both a guest user 12 and a local user 14 through an enterprise-guesting Access Point (AP) 15 that can accommodate both local users and guests. For purposes of discussion, the guest user 12 constitutes a party that has no service relationship with the wireless LAN 11, i.e., the party isn't registered with the wireless LAN and thus lacks the same privileges of a local user 14. Although FIG. 1 depicts a single guest 12 and single local user 14, additional guests and/or users can access the access point 15 or other such access points (not shown) in accordance with the present principles.

For security reasons, traffic from guests should remain segregated from the traffic of local users. In other words, each guest 12 should not have the same privileges as each local user 14. Such local privileges could include access via a corporate intranet 16 to one or more intranet applications residing on a server 17. In the past, segregation of traffic between guests and local users necessitated the use of separate access points. In other words, each guest user 12 would access a guest user access point (not shown), whereas each local user would need to access the wireless LAN 11 through a normal (i.e., local user) access point, such as access point 18, to enjoy the privileges of a local user. Under such an arrangement, a guest could not access the normal access point 18.

In accordance with the present principles, there is provided a technique offering wireless LAN access to both guests and local users that segregates the traffic as between guests and local users while allowing both parties to gain wireless LAN access without the need for separate access points. In other words, both the guest 12 and local user 14 can access the wireless LAN 11 through the access point 15, but only the local user 14 accessing that access point can enjoy the privileges of a local user, including gaining access to the server 17. The guest 12 only has access to the intranet 16 for the purpose of communicating with an external network, such as the internet 19, with such access made through a corporate firewall 20. The present technique makes use of the intelligence in the Wireless LAN 11, and more specifically, the intelligence in the access point 15, to screen guests 12 from local users 14.

As discussed, the access point 15 has the capability to accommodate the different parties seeking wireless LAN access. To that end, the access point 15 has the capability to select the best authentication method for each party. For example, the access point 15 can determine whether a party seeking access has the ability to employ the IEEE 802.1x protocol. If so, the access point 15 initiates authentication based on the IEEE 802.1x protocol. Otherwise, the access point 15 initiates web browser based authentication. Based on the authentication result, access point 15 determines whether the party seeking access constitutes a local user 14 or a guest 12, and routes the traffic accordingly. Each local user 14 undergoes authentication differently than each guest 12. Such different authentication can occur via different backend servers (not shown) or by a single authentication server, such as authentication proxy 21 but with different user credentials for each local user 14 and guest 12.

To better appreciate the manner in which such separate authentication occurs, consider the access arrangement depicted in FIG. 1. Each guest 12 typically receives special guest access credentials in advance of seeking access to the wireless LAN 11. Such credentials can comprise combination of a user name and a password, or simply an access key. All the guests can share a common credential, or each guest can receive a credential unique to that guest. All guest credentials share a common criterion, namely, that such credentials only permit guest accesses.

Various techniques exist which allow guests to use their credentials to authenticate themselves. For example, each guest 12 could configure his/her IEEE 802.1x client with a guest credential. Alternatively, each guest 12 could let the access point 15 initiate web browser-based authentication. Each such technique is described below in greater detail IEEE 802.1x Authentication Under this scenario, the guest 12 configures his/her IEEE 802.1x client with the guest credential and then commences authentication process. Upon receipt of a request for guest authentication using the IEEE 802.1x protocol, the access point 15 communicates with a backend authentication server, such as authentication proxy 21, using a protocol such as the RADIUS protocol. At least two possible ways exist for the access point 15 to distinguish between guests and local users. For example, the access point 15 could possess the ability to communicate with multiple authentication servers (not shown). A guest would configures his/her IEEE 802.1x user name with a domain name (in the form of user_name@domain_name) where domain_name is special and only has local meaning, e.g. "guest_access". Regular local intranet users keep their normal user name format, i.e. just the user name without the domain name. On this basis, the access point 15 could easily differentiate between guests and local users, and forward authentication traffic from the guest 12 to the proper authentication server, such as authentication proxy 21. The access point 15 can directly determine the guest 12 from his/her domain_name without help from the backend server (i.e., authentication proxy 21). Thus no backend server changes are necessary. After successful authentication, the access point 15 can route the user traffic accordingly.

As shown in FIG. 1, the access point 15 communicates with a single authentication server, in the form of authentication proxy 21. Each Guest configures his/her IEEE 802.1x user name in the normal format. The access point 15 forwards all IEEE 802.1x authentication traffic to the authentication proxy 21, which has authentication responsibility. Upon successful authentication, the authentication proxy 21 notifies the access point 15 regarding the success or failure of authentication. The access point 15 can then route the user traffic accordingly.

Web Browser Based Authentication

In the case that a party seeking access does not have an IEEE 802.1x client or has difficulty understanding the configuration process, he or she can choose to employ a user-friendly web browser based authentication technique. Under such circumstances, the access point 15 provides the party seeking access with a welcome page listing various available authentication options. On the welcome page will appear different options, allowing the party seeking access to identify itself as either a guest or local user. The party will select the appropriate option, leading to subsequent authentication. The access point 15 thus can determine whether the party seeking access either is a local user or guest the user based on the party's initial identification.

As described thus far, the determination of whether the party seeking access constitutes a local user or a guest precedes the authentication process. Such a determination need not always precede authentication. For example, it is possible that both guest and local users could use the same configuration (e.g. without a domain). Under such circumstances, the authentication proxy 21 would differentiate between these two types of users by checking a user database (not shown) that would specifically designate guests.

Null Authentication

The wireless LAN 11 could offer an option that would obviate the need for authentication of guests. Under certain circumstances, the wireless LAN 11 could choose not to inconvenience the guest users with special credentials and the login process. Such a decision assumes that those seeking access are sufficiently trustworthy and little if any abuse of the access point 15 would occur (e.g., the wireless signal generated by the access point has a limited coverage and can be contained within the building). In such a case, the access point 15 only needs to distinguish between guests, who require no authentication, and local users that can pass through with authentication. This scenario incurs the difficulty that the guest traffic will not undergo encryption and those accessing the access point 15 hot spot can see all of the traffic. The problem is not necessary critical since most guests 12 connect to their home networks (not shown) through Virtual Private Network (VPN) software and the traffic will be protected by the VPN tunnel.

The foregoing describes a technique for offering wireless LAN access to both guests and local users at a single access point.

What is claimed is:

1. A method for offering wireless network access to both guests and local users, comprising:
   sending a guest credential to a guest user;
   receiving at a common wireless network access point a request for access from one of a guest and local user, said request for access from said guest user including said guest credential;
   determining at the common wireless network access point whether the access request was received from local user or guest, said determining including examining a user domain of a party seeking access to determine whether such user domain designates a guest domain;
   authenticating the request for access received at the common wireless network access point depending on whether the request was received from the guest or local user, wherein the authenticating step further comprises the step of communicating a request for authentication to one or more authentication servers, the authentication being performed differently depending on whether the party seeking access is a local user or a guest;
   if such authentication is successful, then routing traffic from the local user differently from the guest; and
   limiting traffic from said guest according to a guest access policy.

2. The method according to claim 1 wherein the authenticating step further comprises the step of communicating a request for authentication to a single authentication server which performs authentication using different credentials for local users and guests.

3. The method according to claim 1 wherein the authenticating step further comprises the step of ascertaining whether the request for access was received in an IEEE 802.1x format.

4. The method according to claim 3, further comprising: providing web browser based authentication if the request for access was not received in the IEEE 802.1x format.

5. The method according to claim 1 wherein the routing step further comprises the step of routing traffic from a guest to an external network.

6. The method according to claim 1 wherein the routing step further comprises the step of routing traffic from a local user to a corporate intranet.

7. A wireless local area network for offering wireless network access to both guests and local users, comprising:
at least one common wireless network access point offering access to both guests and local users in response to a request for access, the at least one common wireless network access point receiving a request for access from one of a guest and local user, wherein the request for access from the guest user includes a guest credential, the at least one common wireless network access point determining whether the access request was received from a local user or a guest by examining if a user domain received with the access request indicates a guest domain, and the at least one common wireless network access point communicating a request for authentication to at least one server;
the at least one server coupled to the at least one common wireless network access point for authenticating the request for access differently depending on whether the request was received from the guest or local user, and the at least one server also for receiving the request for authentication;
means for routing traffic from the local user differently from the guest to limit traffic from said guest according to a guest access policy.

8. The network according to claim 7 wherein the authentication server performs authentication using different credentials for local users and guests.

9. The network according to claim 7 wherein the at least one wireless network access point ascertains whether the request for access was received in an IEEE 802.1x format or was received in a web-browser format.

10. The network according to claim 9, wherein the at least one common wireless network access point is further configured for providing web browser based authentication if the request for access was not received in the IEEE 802.1x format.

11. The network according to claim 7 wherein the traffic from the guest is routed through a firewall.

* * * * *